July 24, 1951     A. WEAVER     2,561,960

MULTIPLE SPEED COMPOSITE GEAR FOR BICYCLE DRIVES

Filed Nov. 1, 1949     2 Sheets-Sheet 1

Inventor

Alfred Weaver

By *Clarence A. O'Brien and Harvey B. Jacobson*

Attorneys

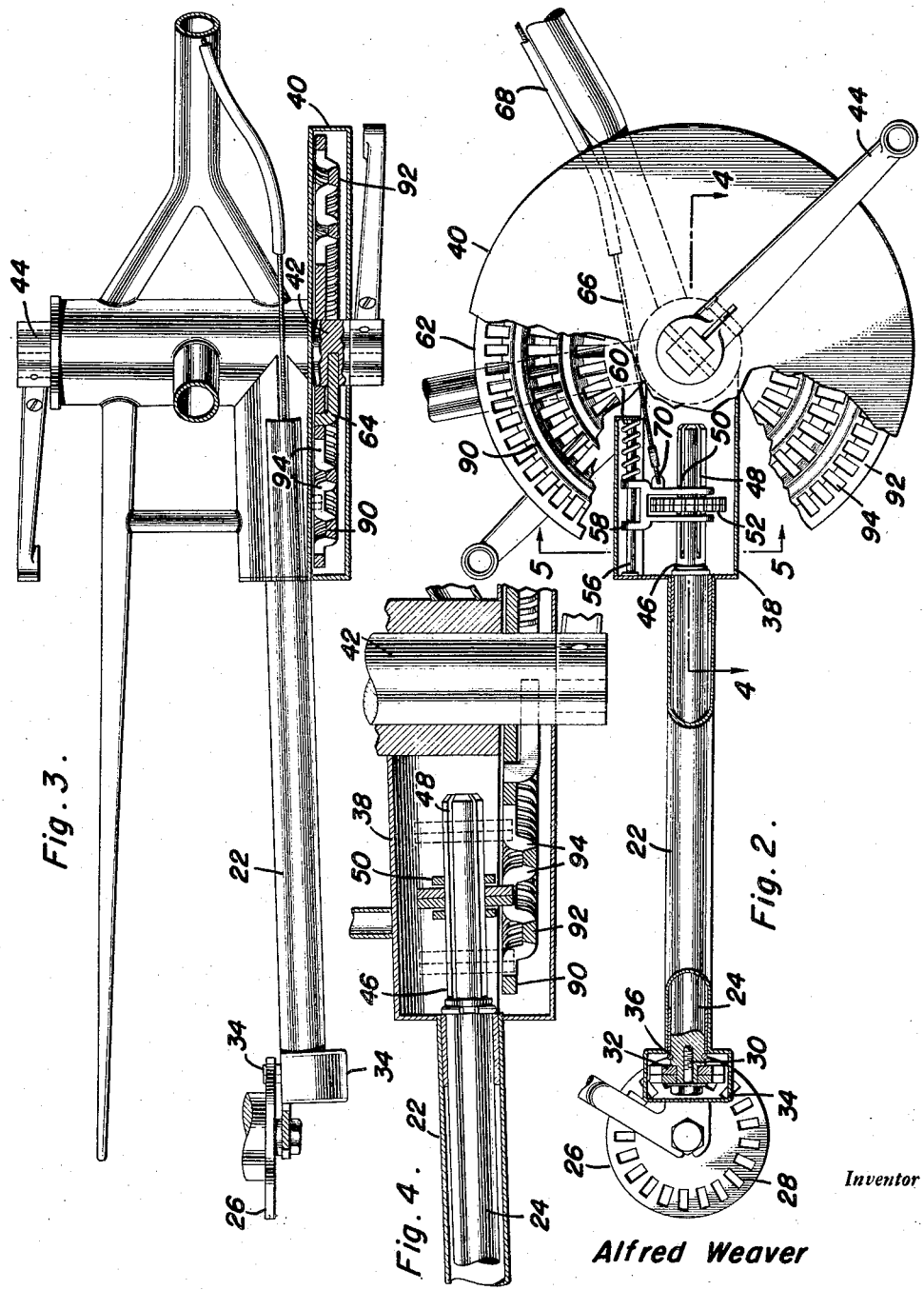

Patented July 24, 1951

2,561,960

UNITED STATES PATENT OFFICE 2,561,960

MULTIPLE SPEED COMPOSITE GEAR FOR BICYCLE DRIVES

Alfred Weaver, Little Falls, N. Y.

Application November 1, 1949, Serial No. 124,861

1 Claim. (Cl. 74—449)

This invention relates to a multiple speed drive for bicycles, the primary object of which is to give greater power for hill climbing and to eliminate the need for the cyclist to walk up hills and push the bicycle.

Another important object of this invention is to provide a multiple speed drive for a bicycle which is relatively simple in design and construction, which is easy to assemble upon conventional bicycles, which is simple to manipulate, and which is extremely efficient for its intended purposes.

A further important object of this invention is to provide a device of the character described which includes a multiple speed gear secured to the pedal shaft for engagement with a sprocket gear that is slidably and non-rotatably retained on a drive shaft, the multiple speed gear being formed of a circular plate that is stamped in a particular way to provide concentrically arranged rows of circumferentially spaced, radially extending apertures constituting the teeth engaging the sprocket gear. The plate is so stamped that the sprocket gear can easily and freely slide radially of the plate towards and away from the pedal shaft, and when the sprocket gear is retained in a desired position by means of an adjustable lever on the frame of the bicycle, the sprocket gear will firmly engage a selected row of teeth so that the bike can be driven at a particular speed, the speed being proportionate to the diameter of the selected row of teeth on the plate.

Yet another object of this invention is to provide a bicycle speed drive comprising a sprocket carried by one wheel of the bicycle, a drive shaft having a gear on one end thereof engaging said sprocket, a fork for said one wheel, one leg of which constitutes a housing for said drive shaft, a second sprocket secured on the pedal shaft of said bicycle, and said second sprocket including concentrically arranged rows of circumferentially spaced teeth, a gear slidably and non-rotatably secured on said drive shaft, and manually operable means for adjustably urging said gear into engagement with a selected row of teeth in said second sprocket.

These, together with various ancillary objects and features of the invention which will later become apparent as the following description proceeds, are attained by the device, a preferred embodiment of which has been illustrated, by way of example only, in the accompanying drawings, wherein:

Figure 2 is a side elevational view of a major portion of the device, parts being broken away and shown in vertical longitudinal section to illustrate details of construction;

Figure 3 is a sectional view taken substantially in the plane of section line 3—3 of Figure 5;

Figure 4 is a sectional view taken substantially in the plane of section line 4—4 of Figure 2;

Specific reference will now be made to the drawings. In the several views, in the accompanying drawings and in the following specification, similar reference characters indicate corresponding elements throughout.

Figure 1:
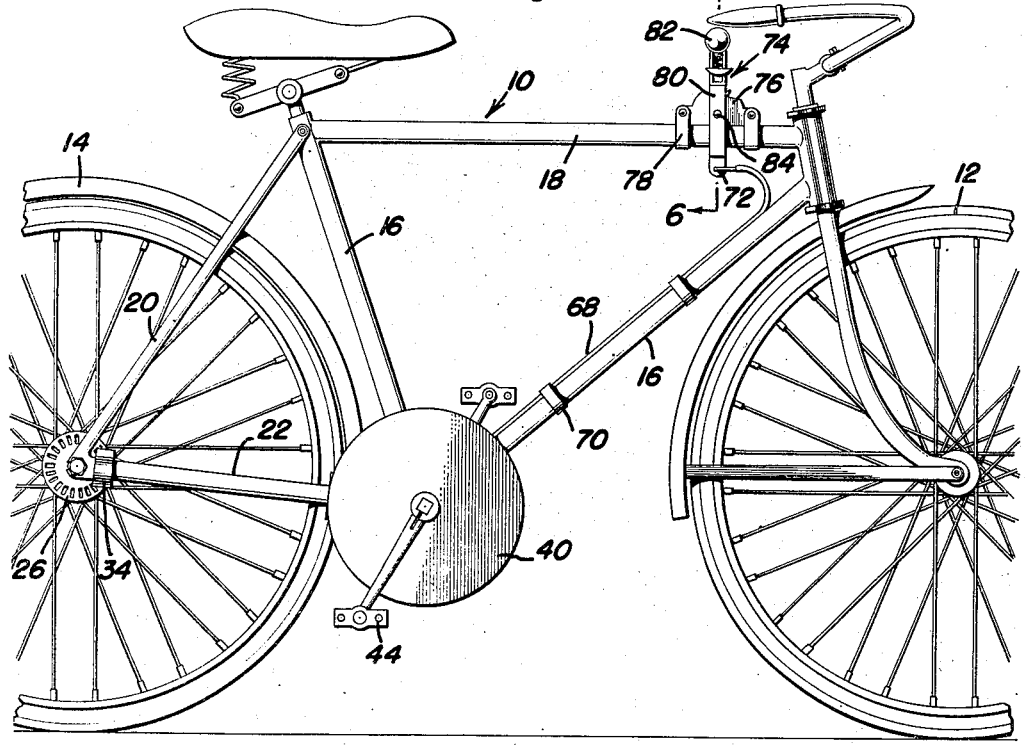
Figure 1 is a side elevational view of the device shown attached to a bicycle.
Figure 5:
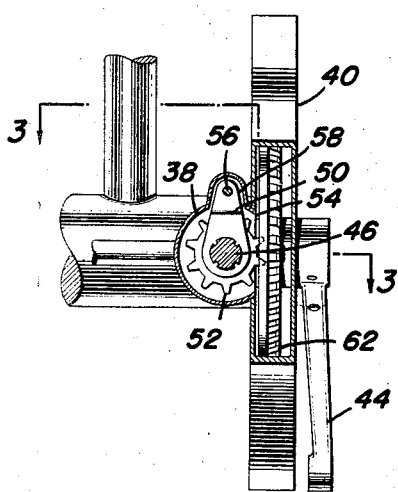
Figure 5 is a sectional view taken substantially in the plane of section line 5—5 of Figure 2.
Figure 6:
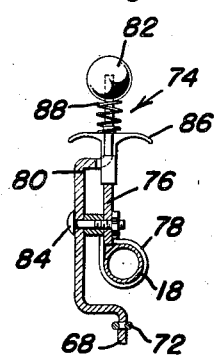
Figure 6 is a sectional view taken substantially in the plane of section line 6—6 of Figure 1.

Indicated generally at 10 is a conventional bicycle having a front wheel 12 and a rear wheel 14, and a frame 16 interconnecting the wheels, the frame including a longitudinal bar 18. The frame 16 includes a fork 20, one leg 22 of which is tubular and constitutes a housing for a drive shaft 24 rotatable therein.

Secured by any appropriate means to the rear wheel 14 centrally thereof is a gear or sprocket plate 26 which is preferably a circular plate having stamped therein adjacent its outer periphery a plurality of circumferentially spaced, radially extending apertures 28 forming, in effect, gear teeth. Secured to the rear end of the drive shaft 24 by means of an appropriate screw 30 is a sprocket 32 having teeth 34 engageable in the apertures 28 for rotating the gear plate 26. The tubular housing 22 is provided with an enlarged end 34 for housing the sprocket 32, a snap ring 36 being provided about the drive shaft 24 to reduce endwise movement of the shaft in the housing 22.

The forward end of the housing 22 has secured thereto or integral therewith a further enlarged housing 38 which is open at one of its sides and extends into a substantially cylindrical housing 40 secured about the pedal shaft 42 to the ends of which are further secured the conventional foot pedals 44.

The forward end of the drive shaft 24 is reduced, as at 46, and splined, as at 48, and extends into the housing 38. Slidably but non-rotatably supported on the drive shaft via the splines 48 is a bracket 50 which carries a toothed gear 52 rotatable with the drive shaft and partially extending through the open end 54 of the housing 38 into the interior of the housing 40.

The housing 38 is so constructed as to retain a rod 56 for slidably receiving spaced ears 58 on the bracket 50, a spring 60 being secured about the rod 56 and tensioned to urge the bracket 50 and toothed gear 52 towards the rear of the drive shaft 24 and away from the pedal shaft 42.

A multiple speed gear 62 is secured as at 64 to one end of the pedal shaft 42 and is retained within the housing 40 for engagement with the toothed gear 52. The actual construction of this multiple speed gear 62 will be described hereinafter. A manually operable means is provided for moving the toothed gear 52 radially of the multiple speed gear 62 towards and away from the pedal shaft 42, and this means includes a cable or wire 66 extending partially through the housing 40 and through a tubular member 68, retained, as at 70, on one of the inclined frame members 16. The cable or wire 66 is terminally secured, as at 70 and 72, to the bracket 50 and a hand lever 74 respectively. The hand lever mechanism 74 includes a toothed segmental bar 76 which is secured by means of brackets or collars 78 to the longitudinal bar 18 of the frame 10. A lever bar 80 having a knob 82 at its upper end is bent around the longitudinal frame bar 18 and is pivoted, as at 84, to the segmental plate or bar 76. Slidable on the upper end of the lever bar 80 is a T-shaped finger 86 which is urged downwardly and into engagement with one of the segments in the segmental bar 76 by means of an appropriate spring 88 interposed between the finger 86 and the knob 82. Thus, it will be seen that the lever mechanism 74 may be pivoted adjustably towards and away from the handle bar of the bicycle to move the toothed gear 52 radially of the multiple speed gear 62.

The multiple speed gear 62 is of novel construction and will be described immediately hereinafter. The gear 62 is a circular plate fabricated of metal, preferably steel, and is stamped in such a manner as to provide concentrically arranged, channel-shaped trough portions 90 and concentrically arranged, channel-shaped, raised or crest portions 92. The crests or raised portions 92 are further stamped to provide elongated, radially extending apertures 94 which are regularly and circumferentially spaced to form, in effect, teeth engageable by the teeth on the sprocket 52. Although three rows of apertures or teeth 94 are shown in the drawings, it will be understood that any number may be provided.

In practical operation, the rider moves the lever mechanism 74 to any desired position on the segmental bar 76 by first lifting the T-shaped finger 86 and then releasing the same, as will be readily understood. This will actuate the rod or wire 66 to move the sprocket wheel 52 radially of the multiple gear 62. Because of the construction of the multiple gear plate 62, which is, in effect, a relatively flat plate with shallow troughs and crests, the sprocket wheel 52 can slide easily on the gear 62 radially thereof from one position to another without any injury to the teeth on the gears. However, when the sprocket wheel 52 is retained in a fixed position relative to the gear 62, it will firmly engage the teeth or apertures 94 of one of the selected rows on the gear 62. This will drivingly interconnect the pedals with the rear wheel 14 to drive the latter at a particular speed, the speed being proportional to the diameter of the engaged row of teeth on the gear 62, as will be readily understood.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A multiple speed gear of sheet metal construction comprising a circular plate stamped to provide concentric rows of channel-shaped crests and concentric rows of channel-shaped troughs between adjacent crests, said crests being provided with circumferentially spaced, radially extending elongated apertures forming teeth selectively engageable by a slidable sprocket gear.

ALFRED WEAVER.

REFERENCES CITED

The following references are of record in the file of this patent:

UNITED STATES PATENTS

| Number | Name | Date |
|---|---|---|
| 536,550 | Snyder | Mar. 26, 1895 |
| 555,886 | Rich | Mar. 3, 1896 |
| 1,093,827 | Cameron | Apr. 21, 1914 |
| 1,662,557 | Zubaty | Mar. 13, 1928 |
| 1,705,933 | Lewis | Mar. 19, 1929 |
| 2,378,634 | Hussey | June 19, 1945 |

FOREIGN PATENTS

| Number | Country | Date |
|---|---|---|
| 29,760 | Great Britain | Dec. 15, 1897 |